United States Patent Office 3,625,706
Patented Dec. 7, 1971

3,625,706
SHORTENING AND CULINARY MIXES CONTAINING GLYCOLIPID EMULSIFIERS
David V. Myhre, Wyoming, and John E. Hunter, Springfield Township, Hamilton County, Ohio, assignors to The Procter & Gamble Company, Cincinnati, Ohio
No Drawing. Filed July 23, 1968, Ser. No. 746,774
Int. Cl. A21d 2/14; A23g 3/00; A23d 5/00
U.S. Cl. 99—94    8 Claims

ABSTRACT OF THE DISCLOSURE

Bakery compositions containing glycolipids, e.g., sugar glycosides esterified with long chain ($C_{16}$–$C_{22}$) fatty acids, are disclosed. The glycolipids are useful as oil/water emulsifiers in bakery and shortening compositions.

FIELD OF THE INVENTION

This invention relates to the use of glycolipid type compounds as emulsifiers in bakery compositions. More particularly, this invention relates to glycolipid emulsifiers used as emulsifiers in dry prepared culinary mixes, in shortenings to be used in the baking of cakes, in dry prepared culinary mixes, and in icings. The glycolipid emulsifiers of this invention are especially useful in dry prepared culinary mixes.

It is an object of this invention to prepare an improved bakery composition. More particularly it is an object of this invention to incorporate certain glycolipid emulsifiers into a shortening to be used in the preparation of cakes or into dry culinary mixes. An additional object of this invention is to provide a dry culinary mix system wherein the shortening which is present in the original dry prepared mix and the water of aqueous phase which is added in the preparation of the cake are rendered compatible and uniform through the incorporation of an emulsifier into the cake mix system to provide compatability between the oil phase, i.e., the shortening, and the aqueuos phase, i.e., the added water, the resulting cake will have better batter aeration during mixing, will have improved cake height and cake volume and will have more delectable eating qualities. An additional object of this invention is to incorporate a glycolipid into shortenings which will subsequently be used in the preparation of cakes and icings to facilitate the formation of oil/water emulsions necessary for the performance of these products.

PRIOR ART

The use of glucoside fatty acid esters (the term glycoside fatty acid ester and glycolipid are used herein interchangeably) as emulsifiers is well known. The use of esterified polyhydric compounds with higher fatty acids as emulsifiers has been disclosed by Mills in U.S. Pat. 2,874,053, Bedenk in U.S. Pat. 3,037,864 (monosaccharide and disaccharide esters of fatty acids), Reynolds in U.S. Pat. 2,132,436 (fatty acid esters of polyhydric materials such as the di-, tri-, and polyols containing at least one unesterified hydroxyl group), and Coith et al. in U.S. Pat. 2,132,397 (fatty acid esters having from 6 to 16 carbon atoms of polyhydric alcohols including both sugars and glycerols with emulsifiers having at least two unesterified hydroxyl groups).

More specifically, Garsky et al. in U.S. Pat. 2,886,438 discloses the use of a substituted glucoside as an emulsifier in cake mix wherein the aglycone portion of the glucoside is an alkyl group containing from 1 to 4 carbon atoms and wherein the free hydroxyl groups in the glucoside are esterified with a fatty acid containing from 6 to 22 carbon atoms. In addition the disclosure of this patent, supra, is the use of hydroxyalkyl (e.g., propylene glycol and butylene glycol) glycoside fatty acid esters in a dry culinary mix. This disclosure leads to the conclusion that the higher polyol glycoside esters (e.g., glycerol glycosides) would not be effective emulsifiers in bakery compositions and specifically in culinary mixes since such compounds were not mentioned in said disclosure. The glycerol glycosides are glycolipids which naturally occur in flour. These naturally occurring glycolipids of unsaturated fatty acids were indeed found to be ineffective as emulsifiers in bakery compositions especially in dry culinary mixes. In contrast to the ineffectiveness of the naturally occurring glycoside esters the glycoside esters of this invention (e.g., the polyol glycoside esters including glycerol of saturated fatty acids) were found to be quite effective as emulsifiers. It was unexpected that the polyol glycoside esters would be effective as emulsifiers in view of the ineffectiveness of naturally occurring plycerol glycoside esters and the disclosure of the last cited patent.

SUMMARY OF THE INVENTION

This invention involves the use of a glycoside ester of a saturated fatty acid, wherein the aglycone portion of the glycoside molecule is a polyhydric material having at least two free hydroxyl groups as an emulsifier in a shortening or bakery composition and particularly in a dry prepared cake mix. The emulsifier of this invention for use in bakery compositions in a glycolipid selected from
(a) compounds having the formula

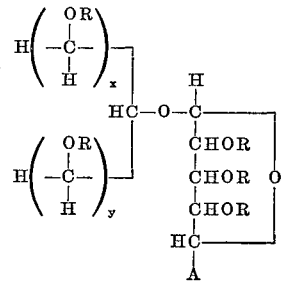

and,
(b) compounds having the formula

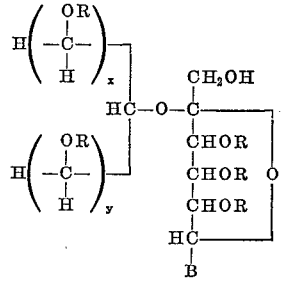

wherein A is selected from the group consisting of hydrogen, —$CH_2OR$, and —$CHOR$—$CH_2OR$; wherein B is selected from the group consisting of hydrogen and —$CH_2OR$; wherein $x$ and $y$ are integers ranging from 0 to about 5 and wherein the sum of $x$ and $y$ ranges from 2 to about 5; wherein each R is selected from the group consisting of hydrogen and saturated acyl groups having from about 10 to about 22 carbon atoms, and wherein at least one R is other than hydrogen. The above-described glycolipid is effective as an emulsified in a dry prepared cake mix when used at a level of from about 0.1% to about 5% by weight of the dry prepared cake mix. The glycolipid is effective as an emulsifier in a shortening to be used in the preparation of cakes and icings when used at a level of from 0.5% to 25%. The glycolipid (or glycoside ester) described above can be prepared by methods well known in the art and described more fully hereinafter.

In its simplest terms the glycolipid of the invention is a fatty acid ester of a polyhydric material, e.g., a sugar glycoside whose aglycone moiety is also a polyhydroxy entity. In the polyhydric material at least one of the hydroxyl sites must be esterified with a fatty acid acyl group. The glycolipid can be considered to consist of three basic components—(1) an anhydrosugar moiety, (2) an aglycone moiety, and (3) fatty acyl chains occupying hydroxyl sites on the anhydrosugar moiety and the aglycone moiety.

The glycosyl, or sugar portion, is an anhydrosugar moiety containing 5 carbon atoms, 6 carbon atoms, or 7 carbon atoms depending on whether A in general Formula a shown above is hydrogen, —CH$_2$OR, or

—CHOR—CH$_2$OR or 6 carbon atoms or 7 carbon atoms depending on whether B in general Formula b above is hydrogen or —CH$_2$OR. Examples of suitable anhydrosugar units are radicals derived from pentoses such as arabinose, ribose, cyclose, lyxose, and xylose; hexoses such as mannose, allose, altrose, idose, talose, cocaose, glucose, galactose, gulose, fructose, and sorbose; heptoses such as glucoheptose, galaheptose, perseulose, and mannoheptose. It should be noted that the stereochemical (optical) configuration of the radicals derived from the pentoses, hexoses, and heptoses is immaterial and it is immaterial whether the anhydrosugar unit is a radical derived from an aldose or a ketose. Radicals derived from glucose and galactose, e.g., where A is —CH$_2$OH, are preferred because of the ready availability of these sugars. B is also preferably hydrogen.

The aglycone moiety is also derived from a polyhydric material containing at least 3 hydroxyls. Suitable aglycone moieties can be radicals derived from glycerol, erythritol, ribitol, xylitol, sorbitol, allitol, dulcitol, lactitol, iditol, mannitol, glucitol, talitol, rhamnitol, galactitol, lyxitol, and arabitol. Radicals derived from polyhydric materials having less than 3 hydroxyl groups, e.g., propylene glycol and butylene glycol, are not suitable for the purposes of this invention. Glycolipids in which the aglycone moiety is derived from a polyhydric material containing at least 3 hydroxyl groups performed unexpectedly better as emulsifiers than did the glycolipids of the prior art. For example, when the glycolipids of this invention (glucosylglycerol dipalmitate) are used in the shortening of a dry prepared cake mix a higher cake height is obtained over that obtained when the glycolipids of the prior art (glucosylpropylene glycol dipalmitate) are used in the shortening of a dry prepared cake mix at an equal level. It was unexpected that compounds so similar, e.g., where the only difference was an aglycone moiety derived from glycerol versus an aglycone moiety derived from propylene glycol, would result in improved cake heights. In addition it was unexpected that there was a marked difference in the performance of the glycolipids of this invention (glycosylglycerol saturated fatty acid esters) in comparison with the performance of naturally occurring glycolipids (glycosylglycerol unsaturated fatty acid esters) as an emulsifier.

As can be seen from examination of suitable aglycone moieties, the stereochemical (optical) configuration of the aglycone moiety is immaterial for the purpose of this invention. In addition as can be seen from examination of the formula of the glycolipids suitable for the purposes of this invention, position isomerism, e.g., the position of attachment of the anhydrosugar unit to the aglycone moiety is also immaterial. Radicals derived from glycerol[1] are preferred in terms of results, because glycerol is low in cost, and because glycerol occurs in many types of edible products.

[1] Where the sum of X+Y in the generic formula is 2.

Since both the anhydrosugar unit and the aglycone moiety are radicals derived from polyhydric materials, both the anhydrosugar unit and the aglycone moiety can have their "hydroxyl sites" esterified with a long chain acyl group. At least one of these sites must be occupied by an acyl group. More than one or all of the hydroxyl sites can be esterified. The degree of esterification will depend on the properties desired in the glycolipid emulsifier. Suitable long chain saturated fatty acyl groups which can be used at the hydroxyl sites present in both the polyhydric anhydrosugar unit and the polyhydric aglycone moiety are as follows: acyl groups derived from long chain fatty acids having from 10 to 22 carbon atoms such as capric, lauric, myristic, palmitic, stearic, arachidic and behenic acids.

Unsaturated fatty acyl groups, especially those having a high degree of unsaturation (e.g., linoleoyl) such as those found in naturally occurring glycolipids are unsuitable and are ineffective for the purposes of this invention. Completely saturated fatty acyl groups having from about 16 to about 22 carbon atoms are preferred, e.g., palmitoyl, stearoyl, arachidoyl and behenoyl.

On examination of the structure of the anhydrosurgar units and aglycone moieties which are suitable, it can be seen that a number of hydroxyl positions are available for esterification with long chain fatty acids. One or more of the hydroxyl positions can be esterified with a long chain fatty acyl group or all of the hydroxyl positions in the sugar can be completely esterified. Since the glycolipid is an ester, at least one fatty acid acyl group must be present in the glycolipid. In the esterification of the sugar glycoside (i.e., the anhydrosugar unit and its aglycone moiety) the hydroxyl sites or positions which are esterified preferentially are the primary hydroxyl sites present in either the anhydrosugar unit or the aglycone moiety. However, secondary hydroxyl sites in either the anhydrosugar unit or the aglycone portion of the molecule can also be esterified. For example where an excess of fatty acid is used in relation to the amount of sugar glycoside present some of the secondary hydroxyl sites can be esterified. Where an excess is used, a distribution of different degrees of esterification will result. For example, where the ratio is three moles of fatty acid to one mole of glycoside, some of the glycoside molecules will be tetrasubstituted and some only disubstituted or monosubstituted. On the average, however, there will be three hydroxyl sites esterified with a ratio of three moles of fatty acid to one mole of glycoside. Thus it is possible from the standpoint of the characteristics desired in the glycolipid emulsifier to obtain sugar glycoside esters as emulsifiers having only one esterified hydroxyl group to a completely esterified sugar glycoside ester by suitably adjusting the processing conditions used in producing the sugar glycoside esters of this invention. Regardless of whether the sugar glycoside is only monosubstituted or more completely substituted, the resulting sugar esters will act as emulsifiers in cake mix formulas. For especially good emulsification properties the sugar glycoside esters are preferentially only partially esterified, e.g., some hydroxyl positions esterified with a fatty acyl group and some unesterified (free) hydroxyl positions, in order to incorporate both hydrophilic and lipophilic properties in the glycolipid molecule. It is preferred that the degree of esterification range from about 20% to about 70% of the hydroxyl sites being esterified, preferably about 40% to about 60%.

Examples of suitable glycolipids or sugar glycoside esters which are usable as emulsifiers in the dry culinary mixes of this invention are as follows: glucosylglycerol monopalmitate, glucosylglycerol dipalmitates, and glucosylglycerol tripalmitate; galactosylmannitol mono-, di-, and tri-myristate, mannosylgalactitol mono-, di-, and tri-laurate, arabinosylglycerol mono- and di-stearate, glucosylsorbitol mono-, di-, and tri-caprate, talosylrhamnitol mono-, di-, and tri-arachidate, glucosylglycerol mono-, di-, and tri-caprate and glucosyliditol mono-, di-, tri- and tetra-behenate. Other combinations of anhydrosugar units, aglycone moieties and fatty acyl groups can be selected based on the disclosure given above and are suitable for the purposes of the invention. The preferred glycolipids are the glucosylglycerol mono-, di- and tri-palmitates, stearates and behenates.

The sugar glycoside esters of this invention can be prepared in the following manner. Glycerol (400 g.), D-glucose (100 g.), and Amberlite IR–120 cation exchange resin (acid form) are stirred in vacuo at 90–95° C. for 20 hours. The reaction mixture is filtered and the filtrate is added to acetic anhydride (2300 ml.) and sodium acetate (190 g.) at a rate such that the temperature does not exceed 115° C. The cooled reaction mixture is poured into ice water with stirring. After standing for 20 hours, the aqueous solution is extracted with chloroform and the chloroform solution is washed successively with aqueous sodium bicarbonate and water. The chloroform is evaporated after which the triacetin is distilled in vacuo at 115° C. (bath temperature).

The residual glucosylglycerol hexaacetate (147 g.) with a small amount of triacetin is dissolved in methanol (600 ml.) and sodium methoxide (0.2 g.) is added. After two hours at room temperature thin layer chromatography indicates that deacetylation is complete with the production of isomeric glucosylglycerols.

Glucosylglycerol (0.1 mole) as prepared above is dissolved in pyridine (100 ml.). Palmitoyl chloride (0.1 mole) is added solwly to the glucosylglycerol with stirring and external cooling to maintain the temperature below 30° C. After several hours at room temperature (approximately 20° C.) the reaction mixture is poured into ice water. The precipitated product is removed by filtration and washed with water after which it is dissolved in chloroform (800 ml.). The chloroform solution is washed successively with 1 N sulfuric acid, 1 N sodium sulfate and water. The chloroform solution is finally evaporated to dryness to yield glucosylglycerol monopalmitate.

Higher sugar glycoside esters, e.g., higher degrees of substitution, can be prepared in the following manner. Glucosylglycerol (0.1 mole) as prepared above is dissolved in pyridine (150 ml.). Palmitoyl chloride (0.2 mole) is added slowly to the glucosylglycerol with stirring and external cooling to maintain the temperature below 30° C. After several hours at room temperature, the reaction mixture is poured into ice water. The precipitated product is removed by filtration and washed with water after which it is dissolved in chloroform (800 ml.). The chloroform solution is successively washed in 1 N sulfuric acid, 1 N sodium sulfate and water. The chloroform solution is finally evaporated to dryness yielding glucosylglycerol dipalmitate. Glucosylglycerol tri- and tetra-palmitate can be prepared using the above procedure by increasing the amount of palmitoyl chloride to 0.3 and 0.4 mole respectively.

The glycolipids of this invention can also be prepared according to the teachings of my copending application, Ser. No. 746,764, filed July 23, 1968, filed simultaneously herewith.

The glycolipids of this invention can be used in bakery compositions such as dry prepared culinary mixes and shortenings to be used in icings. The glycolipids of this invention are especially effective in culinary mixes.

Where the glycolipids of this invention are used in dry culinary mixes they can be incorporated directly into the dry mix or into the shortening to be used in the dry mix. When used in a dry culinary mix the glycolipids of this invention preferably are mixed with the shortening portion of the culinary mixes prior to the incorporation of the shortening into the culinary mix. The glycolipids can be used alone as an emulsifier or the glycolipids can be used in combination with other emulsifiers described more fully hereinafter. The glycolipids of this invention are normally used at from about 0.1% to about 5%, preferably from about 0.3% to about 1.5% by weight of the dry culinary mix.

Dry mixes suitable for the practice of this invention must contain sugar, flour and shortening as well as the emulsifier ingredient. Additional ingredients such as milk solids, hydrophilic colloids, leavening and flavoring can be added to provide the specific type of product desired. The preferred formulation for mixes incorporating the glycolipids of this invention contain about 20% to about 70% sugar, most preferably about 35% to about 50%; about 20% to about 50% flour, most preferably about 30% to about 45%; and about 4% to about 26% shortening, most preferably about 10% to about 20% shortening.

Suitable sugars to be included as a portion of the dry culinary mix include any of the commonly used granular sugars such as sucrose, dextrose, maltose, fructose, lactose and brown and invert sugars. The sugar can also be in powder form and mixtures of more than one type of sugar can be used. The sugars listed above act as the sweetening ingredient of the culinary mix and are separate and distinct from the glycolipids of this invention.

The flour can be the usual bleached cake flour although a good general purpose flour can be substituted for such cake flour especially since emulsifiers are provided in the dry mix. The ratio of sugar to flour can be adjusted as necessary for special circumstances but a ratio of sugar to flour in excess of 1:1 has long been known to result in particularly good cake mixes which are often referred to as "high-ratio" cakes. Cakes in which the ratio of sugar to flour is less than about 1:1, generally referred to as "low-ratio" cakes, are also contemplated herein.

The shortenings which can be employed in the culinary mix systems of this invention include solid or plastic as well as liquid or semi-fluid glyceride shortenings derived from animal, vegetable or marine fats and oils including synthetically prepared shortenings. These glycerides can contain saturated or unsaturated "long-chain" acyl radicals having from about 12 to 22 carbon atoms such as lauroyl, lauroyleoyl, myristoyl, myristoleoyl, palmitoyl, palmitoleoyl, stearoyl, oleoyl, linoleoyl, lonolenoyl, arachidoyl, arachidenoyl, behenoyl, erucoyl and the like and are generally obtained from edible oils and fats such as cottonseed oils, soybean oil, coconut oils, rapeseed oil, peanut oil, olive oil, palm oil, palm kernel oils, sunflower seed oil, rice bran oil, corn oil, sesame seed oil, safflower oil, wallflower oil, pilchard oil, lard, tallow and the like. These glycerides can also contain in part one or two short-chain acyl groups having from about 2 to about 6 carbon atoms such as acetyl, propanoyl, butanoyl, valeryl, and caproyl; they can be prepared by random or low-temperature inner esterification reactions of fatty triglyceride-containing oils and fats such as inner esterified or rearranged cottonseed oil and lard; and they can be otherwise formed by various organic syntheses.

The shortening used in the culinary mixes of this invention can be emulsified, containing up to 50%, and more normally about 0.5 to 25%, preferably 1 to 15%, by weight of the glycoside esters hereinbefore mentioned alone or in combination with one or more additional emulsifiers. The emulsifiers which can be used in combination with the glycolipids of this invention are the partially esterified polyhydric compounds having surface active properties. Included in the class of emulsifiers having surface active properties are as follows: mono- and di-glycerides of fatty acids, such as monobeherin, monostearin, monopalmitin, monoolein, and dipalmitin; partial fatty acid esters of glycols, such as propylene glycol monostearate and monobehenate; higher fatty acid esters of sugar such as the partial palmitic and oleic esters of sucrose; and phosphoric and sulfuric acid esters such as dodecyl glycerol ether sulfate, and monostearin phosphate. Other examples are the partial esters of hydroxy carboxylic acids, such as lactic, citric, and tartaric acids, and with polyhydric compounds, for example, glyceryl-lactopalmitate, and the polyoxyethylene ethers of fatty esters of polyhydric alcohols, such as a polyoxyethylene ether of a sorbitan monostearate or distearate. Fatty acids alone esterified with hydroxycarboxylic acid, e.g., stearyl-2-lactylate, are also useful. The glycolipid emulsifiers of this invention when used in combination with the shortening emulsifiers described hereinbefore are preferably used in a 10:1 to 1:100 ratio to the shortening emulsifiers described above.

Preferably, the emulsifier to be used with the sugar glycoside esters of this invention is any one or combination of the various α-phase crystal tending emulsifiers disclosed in U.S. Pats. 3,145,108 and 3,145,109, issued to Howard on Aug. 18, 1964 and in U.S. Pat. 3,145,110, issued to Abbott on Aug. 18, 1964. Examples of such α-phase crystal tending emulsifiers are propylene glycol monostearate, acylated mono- or di-glycerides and, preferably, lactylated mono- or di-glycerides. Another ingredient which can be used in conjunction with the shortening of these culinary mixes is a high temperature batter stabilizer such as stearic acid, malic stearate, and octadecyl hydrogen succinate or any of the high temperature batter stabilizers which are disclosed in U.S. Pats. 3,145,108 and 3,145,109, issued to Howard on Aug. 18, 1964, U.S. Pat. 3,145,110, issued to Abbott on Aug. 18, 1964, and are also disclosed in U.S. Pat. 3,168,405, issued to Howard and Martin on Feb. 5, 1965. The high temperature batter stabilizer is preferably used in an amount of from about 0.25 to about 4.0% by weight of the shortening.

The selection of the chemical leavening system from among those well known in the art poses no problem for one skilled in the formulation of culinary mixes. In general such systems are composed of baking soda, e.g., sodium, potassium, or ammonium bicarbonate on the one hand and one or more phosphates or other common baking acids on the other. Suitable baking acids include mono-calcium phosphate, di-calcium phosphate, sodium acid pyrophosphate, potassium acid tartrate, mono-sodium phosphate, sodium aluminum phosphate and sodium aluminum sulfate, among others. The amount of soda and the selected acid are so balanced as to achieve a pH in the resultant batter of about 6 to 10. Frequently, provision of a slight excess of soda is advantageous so as to assure absence of unreacted acid/or to compensate for the acid tendency of some batter ingredients.

For many mixes it is accepted practice for the housewife to add the required amount of eggs in the course of batter preparation and this practice can be followed just as well as the present mixes. If desired, the inclusion of egg solids in the mix is an allowable alternative. The function and permissable variations in the remaining ingredients are sufficiently apparent to render the detailed explanations thereof unnecessary. It is to be understood that a wide variety of cakes can be prepared from mixes which contain the above-main ingredients, but, for the purposes of illustration, a specific application of this invention to layer cake mixes will be set forth in detail. The composition of the dry mixes of this invention which are suitable for baking layer cakes can vary but representative combinations are within the following ranges:

| Ingredient: | Dry mix composition (Percent by weight) |
|---|---|
| Flour | 20–50 |
| Sugar | 20–70 |
| Shortening | 4–26 |
| Leavening agent | 0.5–4 |
| Egg solids | 0–5 |
| Hydrophilic colloids | 0–1 |
| Non-fat dried milk solids | 0–5 |
| Coca | 0–10 |
| Flavoring (including spices) | 0–2 |
| Coloring | Minor amounts |
| Glycolipid emulsifiers | 0.1–5 |

The exact method of compounding the dry mixes of this invention is not critical, although very satisfactory results are obtained by mixing in a ribbon blender. The flour, sugar, and shortening are blended into a uniform premix. This premix can be passed through an impact grinder to eliminate lumps. Additional ingredients can then be added and the whole again mixed. An additional step of impact grinding may be desired to remove any lumps present in the final dry mix.

Another method of preparing the dry mix is by the method disclosed in U.S. Pats. 2,874,051, issued to Bedenk et al., 2,874,052, issued to Bedenk on Feb. 17, 1959, and in 2,874,053 issued to Mills on Feb. 17, 1959, in which a uniform blend is formed containing sugar, flour and shortening, and this blend is subjected to simultaneous sheering and crushing forces. The manner in which the emulsifiers of this invention can be added to the dry mix is not critical. Normally they are mixed with the shortening prior to the incorporation of the shortening into the dry mix. However, they can be incorporated directly into the mix.

All types of flour-base prepared layer cake mixes and layer cake batters can be made with the products of this invention. White cakes, yellow cakes, chocolate cakes, devil's food cakes, marble cakes, spice cakes, "high-ratio" as well as "low-ratio" cakes, and many other layer cakes of excellent quality can be prepared simply by mixing the layer cake ingredients together with water in a single mixing step, or multiple mixing steps followed by baking. These layer cake mixes and batters when prepared and baked into a cake will yield good eating quality, high cake volume, and good batter aeration because of the incorporation of the glycolipid emulsifier of this invention, either alone or in combination with other shortening emulsifiers, into the dry culinary mix.

EXAMPLE I

Yellow cake

Dry layer cake mixes of the composition shown in Table 1 below were prepared by blending together thoroughly sugar, flour, and shortening in a conventional heavy-duty mixer, and passing this blend through a standard roller mill. After the milling step, the minor ingredients shown in addition to the sugar, flour and shortening were added to the mixture. The mixture was then subjected to an impact grinding to break up any agglomerates or large particles present.

TABLE 1

Yellow cake mix-basic composition

| Ingredient: | Percent by weight of dry mix |
|---|---|
| Sugar (industrial fine granulated sucrose and dextrose) | 43.77 |
| Flour (soft wheatcake flour) | 40.48 |
| Shortening (a mixture of tallow and directly rearranged lard hydrogenated to an iodine value of about 55) | 11.0 |
| Non-fat dried milk solids | 1.50 |
| Soda | 0.90 |
| Salt | 0.75 |
| Sodium acid pyrophosphate | 0.84 |
| Monocalcium phosphate | 0.36 |
| Carboxymethylcellulose | 0.20 |
| Flavoring | 0.20 |

The shortening used in the above described yellow cake mix formulation was prepared by mixing the shortening emulsifiers at the indicated level with the shortening base stock prior to the incorporation of the shortening into the yellow cake mix formulation. The emulsifiers and the glycolipids of this invention which were used in the shortening portion of the yellow cake formulation are described in Table 2 below. The cake heights shown in Table 2 were obtained by baking a cake from the prepared yellow cake mix. The yellow cake dry mix (540 g.) was mixed with 320 ml. of water and 96 g. of whole egg in a home style mixer for two minutes at medium speed. The batter obtained (468 g.) was poured into an 8″ round pan and baked at 350° F. for 30 to 35 minutes. The cake heights were measured in inches at the center and the edge of the cake immediately upon withdrawing the cake from the oven.

TABLE 2

| Cake | Percent | | | | Cake height (inches) center/edge |
|---|---|---|---|---|---|
| | Shortening base stock* | LAE** | Rapeseed monoglyceride | Glucosylglycerol distearate | |
| A (Control) | 100 | | | | 1.73/1.53 |
| B | 87 | | | 13 | 2.20/1.83 |
| C | 88 | 10 | | 2 | 2.52/2.04 |
| D | 87 | 10 | 3 | | 2.46/2.00 |
| E | 90 | 10 | | | 2.39/1.99 |

* A mixture of tallow and directly rearranged lard hydrogenated to an iodine value of 55.
** Esters of lactic acid and mono- and diglycerides containing saturated fatty acid groups having from about 12 to about 22 carbon atoms.

As can be seen from the results of the cake heights measured at the center of the baked cake and at the edge of the baked cake, the use of glucosylglycerol disteareate in the shortening (Cake B) provided improved cake height over the cake height obtained with the use of no shortening emulsifier (Cake A). In addition the use of glucosylglycerol distearate at only the 2% level (Cake C) combined with 10% LAE resulted in improved cake heights over that obtained with the use of LAE alone (Cake E) or LAE in combination with rapeseed monoglyceride (Cake D). All of the baked cakes shown above, with the exception of Cake A which contained no shortening emulsifier, were of acceptable quality and had good eating qualities.

Additional preparations using the yellow cake mix basic formulation shown above were made in which other examples of sugar glycoside esters of this invention were used in the shortening as emulsifiers. The emulsifiers and the glycolipids of this invention which were used in the shortening portion of the yellow cake formulation are described in Table 3 below and were mixed with the shortening base stock at the indicated level prior to the incorporation of the shortening into the yellow cake formulation. The cakes were prepared and baked in the same manner as described previously for Cakes A to E.

TABLE 3

| Cake | Shortening composition (percent) | | | | Cake height (inches) center/edge |
|---|---|---|---|---|---|
| | Shortening base stock* | LAE | Rapeseed Monoglyceride | Glycolipid | |
| H | 89 | 10 | | ¹1 | 2.46/2.02 |
| J | 88 | 10 | | ¹2 | 2.52/2.04 |
| K | 87 | 10 | | ¹3 | 2.52/2.00 |
| L | 85 | 10 | | ¹5 | 2.42/1.98 |
| M | 88.5 | 10 | | ²1.5 | 2.46/1.85 |
| N | 87.0 | 10 | | ²3.0 | 2.41/1.74 |
| P | 85.5 | 10 | | ²4.5 | 2.41/1.74 |
| Q | 88.5 | 10 | | ³1.5 | 2.55/2.01 |
| R | 87.0 | 10 | | ³3.0 | 2.42/1.96 |
| S | 90 | 10 | | | 2.33/1.92 |
| T | 87 | 10 | 3 | | 2.44/1.99 |
| A (Control) | 100 | | | | 1.73/1.53 |

¹ Glucosylglycerol distearate.
² Glucosylglycerol dipalmitate.
³ Glucosylglycerol tripalmitate.

* A mixture of tallow and directly rearranged lard hydrogenated to an iodine value of 55.

As can be seen from the results of the cake heights measured at the center of the baked cake and at the edge of the baked cake, the use of a sugar glucoside ester in combination with LAE in the shortening (Cakes H–R) resulted in improved cake height over the cake height obtained with the use of no shortening emulsifier (Cake A) and over the cake height obtained with the use of LAE alone (Cake S).

When in the above cake formulations, other glycolipids are substituted on an equivalent basis for the glycolipids used in Example I, substantially equivalent results are obtained in that cake heights are improved over that obtained when on shortening emulsifier is used; e.g., gulsoylglycerol dipalmitate, galactosylmannitol dicaprate, gulosylglycerol tetrapalmitate, galactosyldulcitol monoarachidate, galactosylmannitol dipalmitate, galactosylsorbitol triarachidate, galactosylerylthritol tetralaurate, mannosylgalactitol monostearate, mannosylgalactitol dipalmitate, mannosylgalactitol trilaurate, mannosylgalactitol tetrapalmitate, arabinosylglycerol monostearate, arabinosylglycerol distearate, arabinosylglycerol tripalmitate, arabinosylglycerol tetrapalmitate, gulosylsorbitol monopalmitate, gulsylsorbitol dipalmitate, gulosylsorbitol tripalmitate, gulsoylsorbitol tetrapalmitate, talosylrhamnitol monobehenate, talosylrhamnitol dibehenate, talosylrhamnitol tribehenate, glucosylpolyglecerol monomyristate, glucosylglycerol dimyristate, glucosylglycerol trimristate, and glucosylglycerol tetralaurate.

EXAMPLE II

Devil's food cake

A dry devil's food make mix formulation containing the ingredients shown in Table 4 is prepared:

TABLE 4

Devil's food mix—Basic composition

| Ingredient: | Percent by weight of dry mix |
|---|---|
| Sugar (industrial, fine graulated sucrose and dextrose) | 43.6 |
| Flour (soft wheatcake flour) | 34.2 |
| Shortening (a mixture of tallow and directly rearranged lard hydrogenated to an iodine value of about 55) | 11.0 |
| Cocoa | 6.0 |
| Non-fat dried milk solids | 1.4 |
| Salt | 1.0 |
| Soda | 2.1 |
| Monocalcium phosphate | 0.2 |
| Sodium acid pyrophosphate | 0.2 |
| Carboxymethylcellulose | 0.1 |
| Flavoring | 0.2 |

The dry layer cake mix of the above formulation is prepared by blending together thoroughly the sugar, flour and shortening in a conventional heavy-duty mixed, and passing this bend through a standard roller mill. After the milling step, the minor ingredients in addition to the sugar, flour and shortening are added. The mixture is then subjected to an impact grinding to break up any agglomerates or large particles present.

The shortening in the above formulation is prepared containing the glycolipids of this invention at the levels indicated in Table 5 below:

TABLE 5

| Cake | Shortening emulsifiers used (percent) | | | Cake structure and height |
|---|---|---|---|---|
| | Shortening base stock* | PGMS*** | Sugar glycoside ester | |
| U | 87 | 10 | ⁴3 | Good. |
| V | 87 | 10 | ⁵3 | Good. |
| W | 87 | 10 | ⁶3 | Good. |
| X | 87 | 10 | ⁷3 | Good. |
| Y | 87 | | ⁷13 | Good. |

⁴ Glucosylglycerol dipalmitate.
⁵ Glucosylglyceol monopalmitate.
⁶ Glucosylglycerol distearate.
⁷ Glucosylglycerol monostearate.

*A mixture of tallow and directly rearranged lard hydrogenated to an iodine value of about 55.
***Propylene glycol monostearate.

The glycolipids shown above are added to the shortening along with 10% PGMS (shortening weight basis) and are mixed with the shortening prior to its incorporation into the prepared mix formulation shown in Table 4 above.

The dry mix (540 g.) is mixed with 320 ml. of water and 96 g. of whole egg. The batter obtained (468 g.) is mixed at medium speed in a home style mixer for two minutes. The batter is then poured into and 8" round pan and baked at 350° F. for approximately 35 minutes. The devil's food cakes obtained with the use of the emulsifiers shown above are of acceptable quality and have good eating qualities.

When in the above cake formulations, other glycolipids are substituted on an equivalent basis for the glycolipids used in Example II, substantially equivalent results are obtained in that cake heights are improved over that obtained when no shortening emulsifier is used; e.g., gulosylglycerol dipalmitate, galactosylmannitol dicaprate, gulosylglycerol terapalmitate, galactosyldulcitol monoarachidate, galactosylmannitol dipalmitate, galactosylsorbitol triarachidate, galactosylerylthritol tetralaurate, mannosylgalactitol monostearate, mannosylgalactitol dipalmitate, mannosylgalactitol trilaurate, mannosylgalactitol tetrapalmitate, arabinosylglycerol monostearate, arabinosylglycerol tripalmitate, arabinosylglycerol tetrapalmitate, gulosylsorbitol monopalmitate, gulosylsorbitol dipalmitate, gulosylsorbitol tripalmitate, gulosylsorbitol tetrapalmitate, talosylrhamnitol monobehenate, talosylrhamnitol dibehenate, talosylrhamnitol tricaprate, talosylrhamnitol tetrabehenate, glucosylglycerol monomyristate, glucosylglycerol dimyristate, glucosylglycerol trimyristate, and glucosylglycerol tetralaurate.

The glycolipids of this invention also can be used as an additive in a shortening which is to be subsequently used in a bakery composition such as cakes (e.g., cakes which are prepared by the housewife by mixing the ingredients herself) and icings. When the glycolipids are so used normally they will be incorporated directly into the shortening. The shortenings in which the glycolipids of this invention can be used are hereinbefore described in the specification (see column 6, lines 32 to 54). The glycolipids of this invention can also be used in shortenings in combination with other shortening emulsifiers hereinbefore mentioned.

A typical shortening composition containing the glycolipids of this invention to be used in bakery compositions is as follows:

Shortening A

| Ingredient: | Composition (percent by weight) |
|---|---|
| Partially hydrogenated blend of soybean and cottonseed oils (weight ratio 85:15) having an iodine value of 70 to 75 | 75–99.5 |
| Glycolipid emulsifier | 0.5–25 |

A second example of a typical shortening employing the glycolipid emulsifiers of this invention is as follows:

Shortening B

| Ingredient: | Composition (percent by weight) |
|---|---|
| Mixture of tallow and directly rearranged lard hydrogenated to an iodine value of 55 | 75–99.5 |
| Glycolipid emulsifier | 0.5–25 |

Other shortening formulations incorporating the glycolipid emulsifiers of this invention can be devised by those skilled in the art based on the disclosure given above without departing from the spirit and scope of this invention. The shortenings shown above can be effectively used to prepare cakes and icings.

EXAMPLE III

Shortening composition

A shortening composition employing the glycolipid emulsifiers of this invention is prepared by mixing the ingredients shown in Table 6 below in the proportions indicated:

TABLE 6

| Ingredient: | Composition (percent by weight) |
|---|---|
| Mixture of tallow and directly rearranged lard hydrogenated to an iodine value of 55 | 95 |
| Glucosylglycerol dipalmitate | 5 |

When the above shortening is used to prepare a cake, a cake of good eating quality and improved cake height is obtained.

Other glycolipids can be substituted on an equivalent basis for the glucosylglycerol dipalmitate of Example III above to obtain substantially similar results. These glycolipids are described in greater detail in Example I, (see column—lines—).

The glycolipids of this invention can also be advantageously used in a cream icing since the emulsifying properties of the glycolipid create a uniform composition. Typical icings in which the glycolipids of this invention can be used are illustrated in the following example.

EXAMPLE IV

Cream icing

A cream icing is prepared with Shortening A or with Shortening B described hereinbefore consisting of the following ingredients:

| Ingredient: | Composition (percent by weight) |
|---|---|
| Shortening | 17 |
| Nonfat milk solids | 4 |
| 6X powdered sugar (sucrose) | 67 |
| Water | 12 |

The ingredients are mixed for about 5 minutes with a Hobart C–100 mixer with the ingredients adhering to the side of the mixing bowl being scraped down at intervals of 2½ minutes. The mixing is continued at a higher speed for an additional 10 minutes to form a very good, creamy white cake icing.

What is claimed is:
1. A shortening containing a glycolipid selected from
(a) compounds having the formula

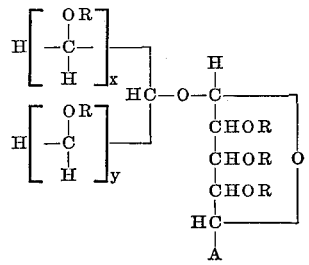

and
(b) compounds having the formula

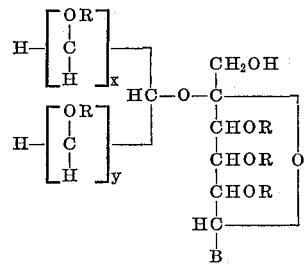

wherein A is selected from the group consisting of hydrogen, —CH$_2$OR, and —CHOR—CH$_2$OR; wherein B is selected from the group consisting of hydrogen and —CH$_2$OR; wherein $x$ and $y$ are integers ranging from 0 to about 5 and wherein the sum of $x$ and $y$ ranges from 2 to about 5; wherein R is selected from the group consisting of hydrogen and saturated acyl groups having from about 10 to about 22 carbon atoms, and wherein at least one R is such a saturated acyl group; said glycolipid being present in an amount ranging from about 0.5% to about 25% by weight of the shortening.

2. The shortening of claim 1 wherein the glycolipid is present in an amount ranging from about 1% to about 15%.

3. A dry prepared culinary mix containing sugar, flour, and from about 4% to about 26% of the shortening of claim 1.

4. An icing containing sucrose, nonfat milk solids, water, and about 17% of the shortening of claim 1.

5. A shortening containing a glycolipid selected from
(a) compounds having the formula

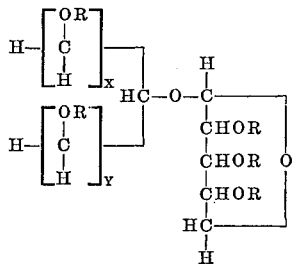

and
(b) compounds having the formula

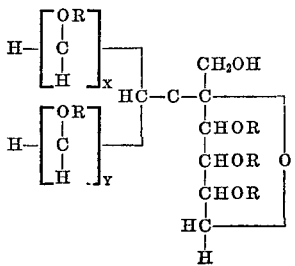

wherein $x$ and $y$ are integers ranging from 0 to 2 and the sum of $x$ and $y$ is 2; and wherein R is selected from the group consisting of hydrogen and saturated acyl groups having from about 14 to about 22 carbon atoms; and glycolipid being present in an amount ranging from about 0.5% to about 25% by weight of the shortening.

6. The shortening of claim 5 wherein the acyl groups are selected from the group consisting of palmitoyl, stearoyl, arachidoyl and behenoyl.

7. A dry prepared culinary mix containing from about 20% to about 70% sugar, from about 20% to about 50% flour, from about 4% to about 26% of the shortening of claim 6.

8. The culinary mix of claim 7 wherein the shortening also contains in addition to the glycolipid an α phase crystal tending emulsifier in a ratio of 100 to 1 to 1 to 10 with the glycolipid.

References Cited
UNITED STATES PATENTS

| | | | |
|---|---|---|---|
| 2,886,438 | 5/1959 | Barsky et al. | 99—123 X |
| 2,978,329 | 4/1961 | Cochran et al. | 99—94 X |
| 3,194,666 | 7/1965 | Bedenk et al. | 99—118 X |

RAYMOND N. JONES, Primary Examiner

J. M. HUNTER, Assistant Examiner

U.S. Cl. X.R.

99—118, 123 139